US012573894B2

(12) United States Patent
Yang et al.

(10) Patent No.: US 12,573,894 B2
(45) Date of Patent: Mar. 10, 2026

(54) HYBRID PERMANENT MAGNET MOTOR ROTOR, HYBRID PERMANENT MAGNET MOTOR, AND VEHICLE

(71) Applicant: NIDEC CORPORATION, Kyoto (JP)

(72) Inventors: Kuan Yang, Taipei City (TW);
Pei-Chun Shih, Taipei City (TW);
Ta-Yin Luo, Taipei City (TW);
Guo-Jhih Yan, Taipei City (TW);
Sheng-Chan Yen, Taipei City (TW);
Cheng-Tsung Liu, Kaohsiung (TW)

(73) Assignee: NIDEC CORPORATION, Kyoto (JP)

( * ) Notice: Subject to any disclaimer, the term of this patent is extended or adjusted under 35 U.S.C. 154(b) by 208 days.

(21) Appl. No.: 18/455,627

(22) Filed: Aug. 25, 2023

(65) Prior Publication Data

US 2024/0113575 A1    Apr. 4, 2024

(30) Foreign Application Priority Data

Sep. 27, 2022    (CN) .......................... 202211183833.7

(51) Int. Cl.
*H02K 1/2706* (2022.01)
*H02K 1/12* (2006.01)

(52) U.S. Cl.
CPC ............. *H02K 1/2706* (2013.01); *H02K 1/12* (2013.01)

(58) Field of Classification Search
CPC .............................. H02K 1/276; H02K 1/2766
See application file for complete search history.

(56) References Cited

U.S. PATENT DOCUMENTS

| | | | | |
|---|---|---|---|---|
| 2019/0036399 | A1* | 1/2019 | Yamada | H02K 3/28 |
| 2020/0212738 | A1* | 7/2020 | Kano | H02K 21/14 |
| 2020/0412217 | A1* | 12/2020 | Yen | H02K 1/246 |
| 2022/0103030 | A1* | 3/2022 | Tsukamoto | F25B 31/026 |
| 2022/0149682 | A1* | 5/2022 | Watanabe | H02K 1/2766 |

(Continued)

FOREIGN PATENT DOCUMENTS

| | | | | |
|---|---|---|---|---|
| CN | 109560676 A | * | 4/2019 | H02K 1/27 |
| CN | 109617279 A | | 4/2019 | |
| CN | 109818474 A | | 5/2019 | |

(Continued)

OTHER PUBLICATIONS

WO-2016179841-A1 Machine Translation (Year: 2016).*

(Continued)

*Primary Examiner* — Oluseye Iwarere
*Assistant Examiner* — Masoud Vaziri
(74) *Attorney, Agent, or Firm* — HAUPTMAN HAM, LLP

(57) ABSTRACT

A hybrid permanent magnet motor rotor rotates around a central axis, and includes: a rotor core provided with a plurality of magnet installation slots; and a plurality of magnet parts embedded inside a plurality of magnet installation slots respectively, wherein the rotor is provided with a plurality of first magnetic pole parts and a plurality of second magnetic pole parts, the magnetic poles of the first magnetic pole part and the second magnetic pole part are arranged in opposite and alternately in the circumferential direction, and the magnetic placement of the first magnetic pole part is different from that of the second magnetic pole part, the amount of magnets used in the second magnetic pole part is greater than that used in the first magnetic pole part.

1 Claim, 12 Drawing Sheets

(56) References Cited

U.S. PATENT DOCUMENTS

2023/0063523 A1 * 3/2023 Aso ........................ H02K 15/03
2023/0283130 A1 * 9/2023 Zhang ................. H02K 1/2766
310/156.01

FOREIGN PATENT DOCUMENTS

CN          210724359  U   *   6/2020
JP          H11103545  A   *   4/1999   ........... H02K 1/2766
JP          2019103173  A       6/2019
WO      WO-2016179841  A1  *  11/2016

OTHER PUBLICATIONS

JP-H11103545-A Machine Translation (Year: 1999).*
CN-109560676-A Machine Translation (Year: 2019).*
CN-210724359-U Machine Translation (Year: 2020).*

* cited by examiner stator air gap rotor

1E current angle(deg.)

HYBRID PERMANENT MAGNET MOTOR ROTOR, HYBRID PERMANENT MAGNET MOTOR, AND VEHICLE

CROSS-REFERENCE TO RELATED APPLICATIONS

The present invention claims priority under 35 U.S.C. § 119 to Chinese Patent Application No. 202211183833.7 filed on Sep. 27, 2022, the entire content of which is incorporated herein by reference.

TECHNICAL FIELD

The present invention relates to a hybrid permanent magnet motor rotor, a hybrid permanent magnet motor, and a vehicle.

BACKGROUND

In recent years, research is being carried out to reduce the amount of permanent magnet materials used in permanent magnet motor. A motor using consequent pole type of rotor is known, which forms the first magnetic pole through the magnet embedded in the rotor core and forms the second magnetic pole through the part of the rotor core adjacent to the magnet.

FIG. 1b shows an example of applying the rotor of the consequent pole motor mentioned above. Compared to the application of a general permanent magnet motor shown in FIG. 1a, by using the consequent pole motor rotor mentioned above, only half of the magnetic flux is required to provide a magnetic flux similar to that of a general permanent magnet motor. Specifically, as shown in the magnetic circuit on the right side of FIG. 1a, the magnetic flux $\Phi_{Pm}$ of a general permanent magnet motor is:

$$\text{magnetic flux of general permanent magnet motor} (\Phi_{pm}) = \frac{2 \times MMF_{pm}}{2 \times (R_a + R_{pm})} = \frac{MMF_{pm}}{(R_a + R_{pm})}$$

(In the formula, $MMF_{pm}$: magnetomotive force; $R_a$: air gap magnetoresistance; $R_{pm}$: magnetoresistance).

For example, assuming an air gap of 0.5 mm and a magnet thickness of 4.5 mm, then $R_a$: $R_{pm}$=1:9 and the magnetic flux is:

$$\text{magnetic flux} = \frac{MMF_{pm}}{10 \times R_a}$$

On the other hand, as shown in the magnetic circuit on the right side of FIG. 1b, the magnetic flux of consequent pole type permanent magnet motor $\Phi_{cpm}$ is:

$$\text{magnetic flux of consequent pole type permanent magnet motor} (\Phi_{cpm}) = \frac{MMF_{pm}}{2 \times R_a + R_{pm}}$$

(In the formula, $MMF_{pm}$: magnetomotive force; $R_a$: air gap magnetoresistance; $R_{pm}$: magnetoresistance).

Assuming an air gap of 0.5 mm and a magnet thickness of 4.5 mm, then $R_a$: $R_{pm}$=1:9 and the magnetic flux is:

$$\text{magnetic flux} = \frac{MMF_{pm}}{11 \times R_a}$$

In this way, by using the consequent pole motor rotor mentioned above, only half of the magnetic flux is required to provide a magnetic flux similar to that of a general permanent magnet motor. However, if the torque composition of the general permanent magnet motor is compared with that of the consequent pole motor, then in the case of using the consequent pole motor rotor mentioned above, the reluctance torque is reduced, so in order to achieve the target output torque, the amount of magnets must be increased again, but the generated open circuit counter-electromotive force will also increase.

Specifically, in the case of the general permanent magnet motor mentioned above, the torque equation is:

$$T_t = \frac{3P}{2} \left( (\lambda_{pm} I \cos(\theta)) + \left((L_d - L_q) I^2 \sin(2\theta)\right) \right)$$

(In the formula, $T_t$: total torque; P: motor pole pairs; $\lambda_{pm}$: flux chain; I: current; $\theta$: current angle; $L_d$=d-axis inductance; $L_q$=q-axis inductance).

Assuming the electromagnetic torque with a reluctance torque of 2:1, as shown in FIG. 2a, a maximum total torque of 2.6, an electromagnetic torque of 1.73 (67%), and a reluctance torque of 0.87 (33%).

On the other hand, in the case of the consequent pole type permanent magnet motor mentioned above, the torque equation is:

$$T_t = \frac{3P}{2} \left( (\lambda_{pm} I \cos(\theta)) + \left(\frac{1}{2}(L_d - L_q) I^2 \sin(2\theta)\right) \right)$$

Assuming all parameters are the same as the general permanent magnet motor mentioned above, but due to the reduction of the magnet installation slot area to half of the general permanent magnet motor, the reluctance torque component becomes 50% (i.e. ½) of the general permanent magnet motor. In the case of the consequent pole type permanent magnet motor, as shown in FIG. 2b, the maximum total torque is 2.21, the electromagnetic torque is 1.84 (83%), and the reluctance torque is 0.37 (17%). It is necessary to increase the amount of magnets to achieve the target output torque (from 2.21 to 2.60), at this point, the amount of permanent magnets used is approximately 60% of that of a general permanent magnet motor (from 50% to 60%, the amount of magnets used increases by 20%). As a result, the magnetic flux increases, and the open circuit counter-electromotive force also increases by about 20%. For example, when the above consequent pole type permanent magnet motor is used in the vehicle, the IGBT driver has a withstand voltage limit, and excessive open circuit counter-electromotive force will lead to breakdown of the IGBT, affecting driving safety.

Therefore, it is expected to provide a permanent magnet motor that can reduce the consumption of permanent magnet materials while achieving appropriate torque and restraining the increase of open circuit counter-electromotive force.

SUMMARY

The purpose of the invention is to provide a hybrid permanent magnet motor rotor that can reduce the amount of permanent magnet materials while achieving appropriate torque and restraining the increase of open circuit counter-electromotive force, and a hybrid permanent magnet motor and vehicle that use the hybrid permanent magnet motor rotor. One form of the hybrid permanent magnet motor rotor in the present invention, rotating around a central axis, and comprising: a rotor core provided with a plurality of magnet installation slots; and a plurality of magnet parts embedded inside a plurality of magnet installation slots respectively, wherein the hybrid permanent magnet motor rotor is provided with a plurality of first magnetic pole parts and a plurality of second magnetic pole parts, the magnetic poles of the first magnetic pole part and the second magnetic pole part are arranged in opposite and alternately in the circumferential direction, and the magnetic placement of the first magnetic pole part is different from that of the second magnetic pole part, the amount of magnets used in the second magnetic pole part is greater than that used in the first magnetic pole part.

The rotor of the hybrid permanent magnet motor according to one form of the invention, for example, can reduce the consumption of permanent magnet materials, reduce the manufacturing cost of the hybrid permanent magnet motor, and achieve appropriate torque and restrain the increase of open circuit counter-electromotive force compared with the situation of general permanent magnet motor.

A plurality of the magnet parts can be manufactured from the same type of permanent magnet material. By constructing in this way, the amount of permanent magnet material can be reduced and the output torque per unit weight of the magnet can be increased.

The rotor of the hybrid permanent magnet motor mentioned above can also be such that when observed axially, a plurality of the magnet parts are symmetrically constructed relative to the d-axis. By constructing in this way, it is possible to further suppress the situation that the motor has different torque outputs during forward and reverse rotation.

One form of the hybrid permanent magnet motor in the present invention, comprising: any of the aforementioned hybrid permanent magnet motor rotors; and a stator, which is arranged via an air gap relative to the hybrid permanent magnet motor rotor in the radial direction.

The rotor of the hybrid permanent magnet motor according to one form of the invention, for example, can reduce the consumption of permanent magnet materials, reduce the manufacturing cost of the hybrid permanent magnet motor, and achieve appropriate torque and restrain the increase of open circuit counter-electromotive force compared with the situation of general permanent magnet motor. In the present invention, by adjusting the magnetic circuit design, it is possible to maintain the same level of electromagnetic and reluctance torque with less magnetic usage.

The above-mentioned hybrid permanent magnet motor can also be such that, a plurality of the magnet installation slots includes: a first magnet installation slot is located at the first magnetic pole part; a second magnet installation slot located at the second magnetic pole part; and a third magnet installation slot located at the second magnetic pole part, the third magnet installation slot is located on the air gap side of the second magnet installation slot when observed axially, and is arranged closer to the air gap than the first magnet installation slot in the radial direction, a plurality of the magnet parts include: a first magnet part embedded inside the first magnet installation slot; a second magnet part embedded inside the second magnet installation slot; and a third magnet part embedded inside the third magnet installation slot.

The hybrid permanent magnet motor mentioned above can also be such that, the first magnetic pole part includes a pair of the first magnet installation slots extending separately from each other in the circumferential direction as they moving towards the air gap side when observed axially; a pair of the second magnet installation slots extending separately from each other in the circumferential direction as they moving towards the air gap side when observed axially; and the third magnet installation slots with a straight line shape extending in a tangential direction when observed axially. By constructing in this way, excellent torque performance can be achieved.

The above-mentioned hybrid permanent magnet motor can also be such that, the hybrid permanent magnet motor rotor is located radially inside of the stator, when the distance between the circumferential center of a pair of the first magnet installation slots and the central axis is set to a when observed axially, and the distance between the circumferential center of a pair of the second magnet installation slots and the central axis is set to b when observed axially, a>b is satisfied. By constructing in this way, better torque performance can be further achieved.

It is preferred that when the included angle between a pair of first magnet installation slots when observed axially is set to be c, and the included angle between a pair of second magnet installation slots when observed axially is set to be d, d>c is satisfied. By constructing in this way, better torque performance can be further achieved.

The hybrid permanent magnet motor mentioned above can also be such that, the first magnetic pole part includes a pair of the first magnet installation slots extending separately from each other in the circumferential direction as they moving towards the air gap side when observed axially; a pair of the second magnet installation slots extending separately from each other in the circumferential direction as they moving towards the air gap side when observed axially; and the third magnet installation slots extending separately from each other in the circumferential direction as they moving towards the air gap side when observed axially.

The hybrid permanent magnet motor mentioned above can also be such that, the rotor core is provided with at least one magnetic resistance groove axially penetrating on the side of the first magnetic pole part closer to the air gap than the magnetic installation slot. By forming it in this way, it can play a role in suppressing torque pulsation.

One form of the vehicle in the present invention is provided with any of the aforementioned hybrid permanent magnet motor.

The vehicle according to one form of the invention, for example, can reduce the consumption of permanent magnetic materials, achieve appropriate torque, restrain the increase of open circuit counter-electromotive force, and reliably ensure driving safety compared with the situation of using general permanent magnet motor.

BRIEF DESCRIPTION OF THE DRAWINGS

FIG. 8a shows the torque curve corresponding to the example in FIG. 7a.

DESCRIPTION OF THE EMBODIMENTS

Below, with reference to the accompanying drawings, a hybrid permanent magnet motor according to the embodiment of the present invention will be explained. In addition, in the following figures, in order to facilitate the understanding of each structure, sometimes the actual structure is different from the scale, quantity, etc. in each structure.

In the following descriptions, the direction parallel to axial direction the central axis is referred to as "axial", the radial direction centered on the central axis is referred to as "radial", and the circumferential direction centered on the central axis is referred to as "circumferential". In each diagram, appropriately use arrow C to indicate the circumferential direction.

Figure 1A:
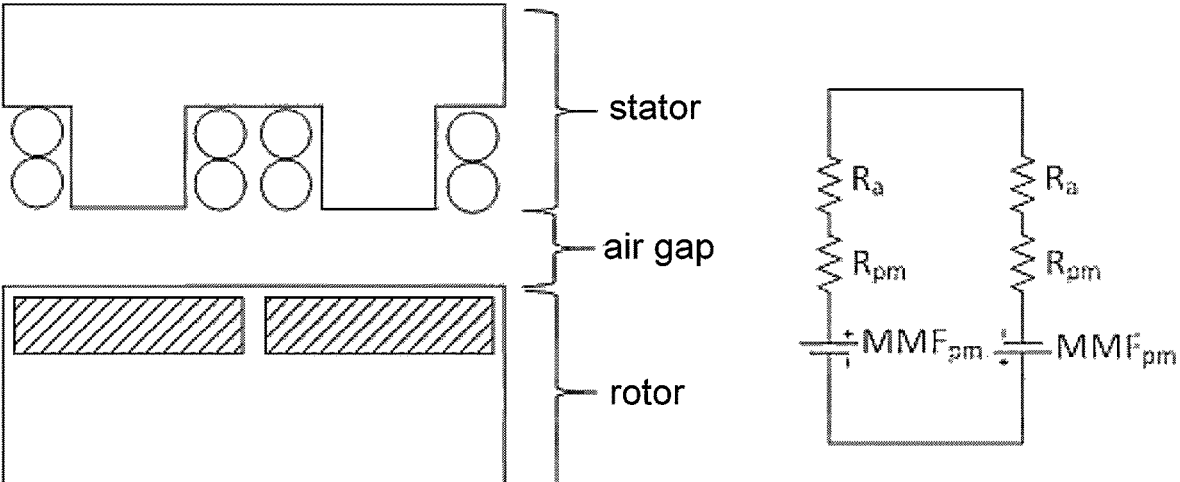
FIG. 1*a* is a partial schematic diagram showing an example of the current general permanent magnet motor and its corresponding magnetic circuit.
Figure 1B:
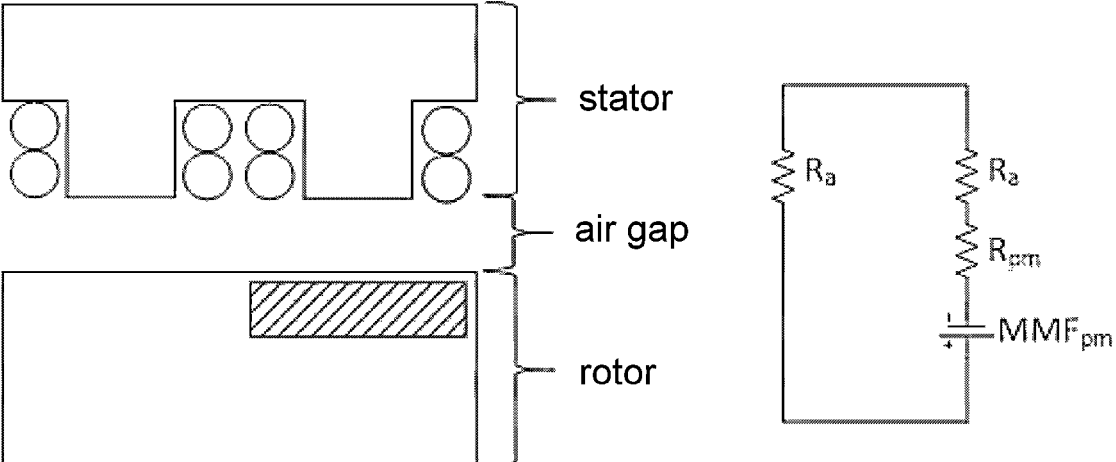
FIG. 1*b* is a partial schematic diagram showing an example of the current consequent pole permanent magnet motor and its corresponding magnetic circuit.
Figure 2A:
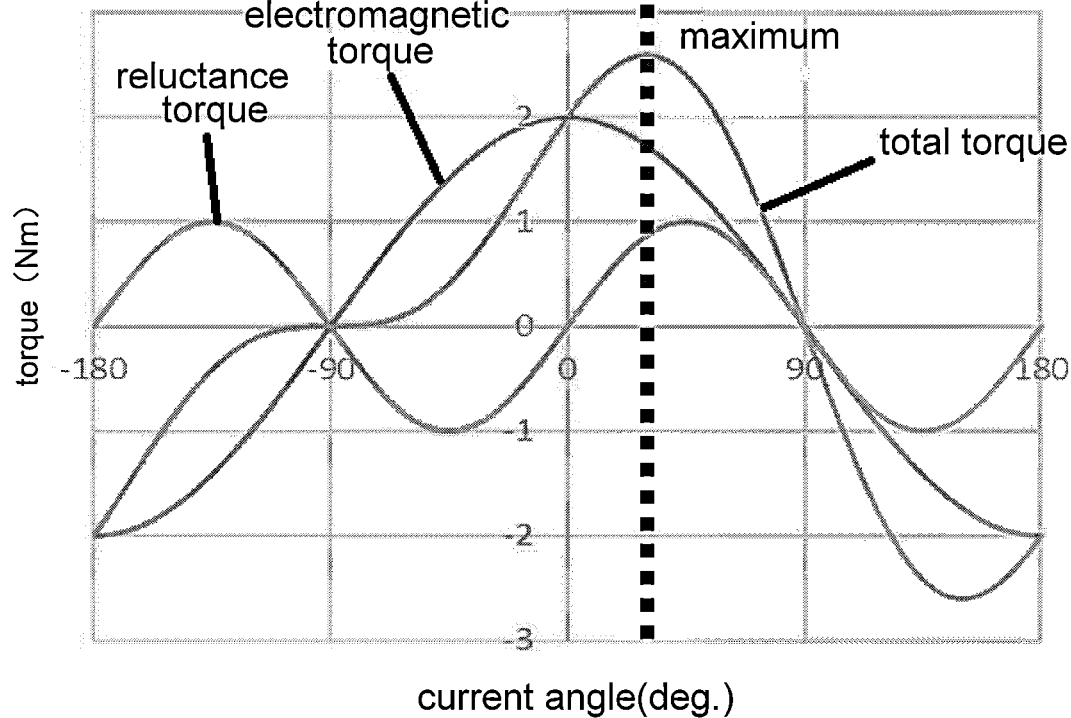
FIG. 2*a* shows the torque curve corresponding to the example in FIG. 1*a*.
Figure 2B:
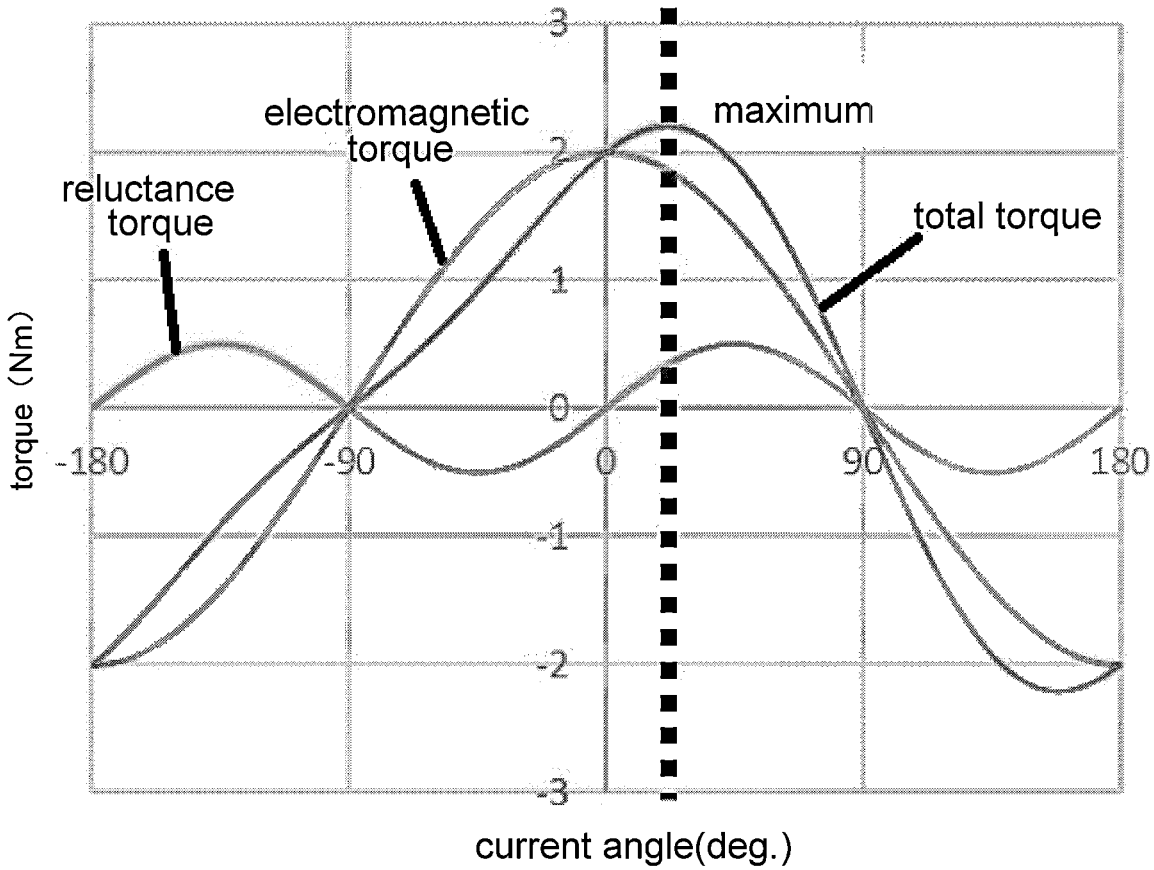
FIG. 2*b* shows the torque curve corresponding to the example in FIG. 1*b*.
Figure 3:
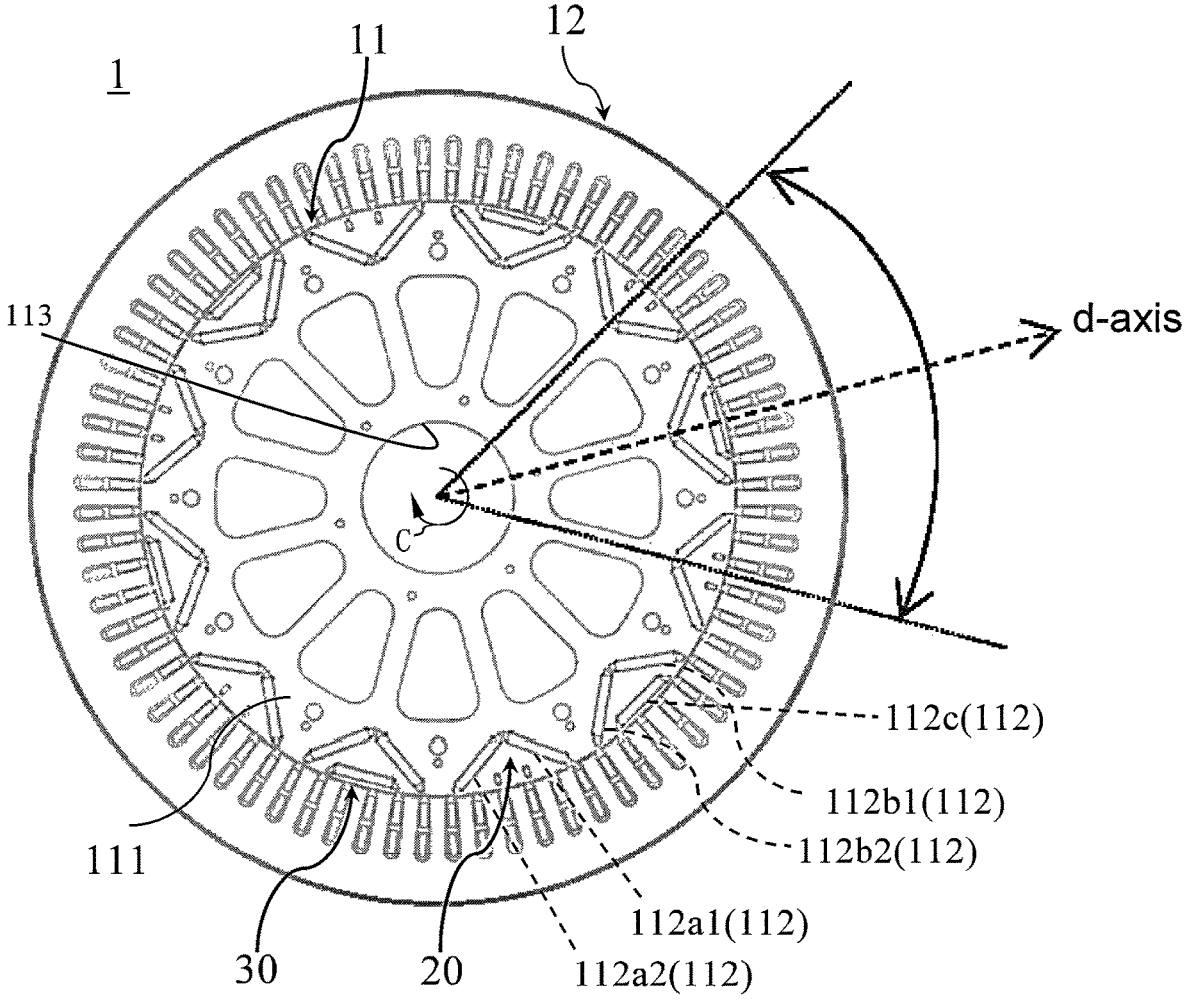
FIG. 3 is a cross-sectional view schematically illustrating the hybrid permanent magnet motor of the first embodiment.

In this description, the side that advances in the direction of arrow C in FIG. 3 is referred to as the "one side in the circumferential direction". The side that advances in the opposite direction of arrow C is referred to as "the other side in the circumferential direction".

First Embodiment

Figure 4:
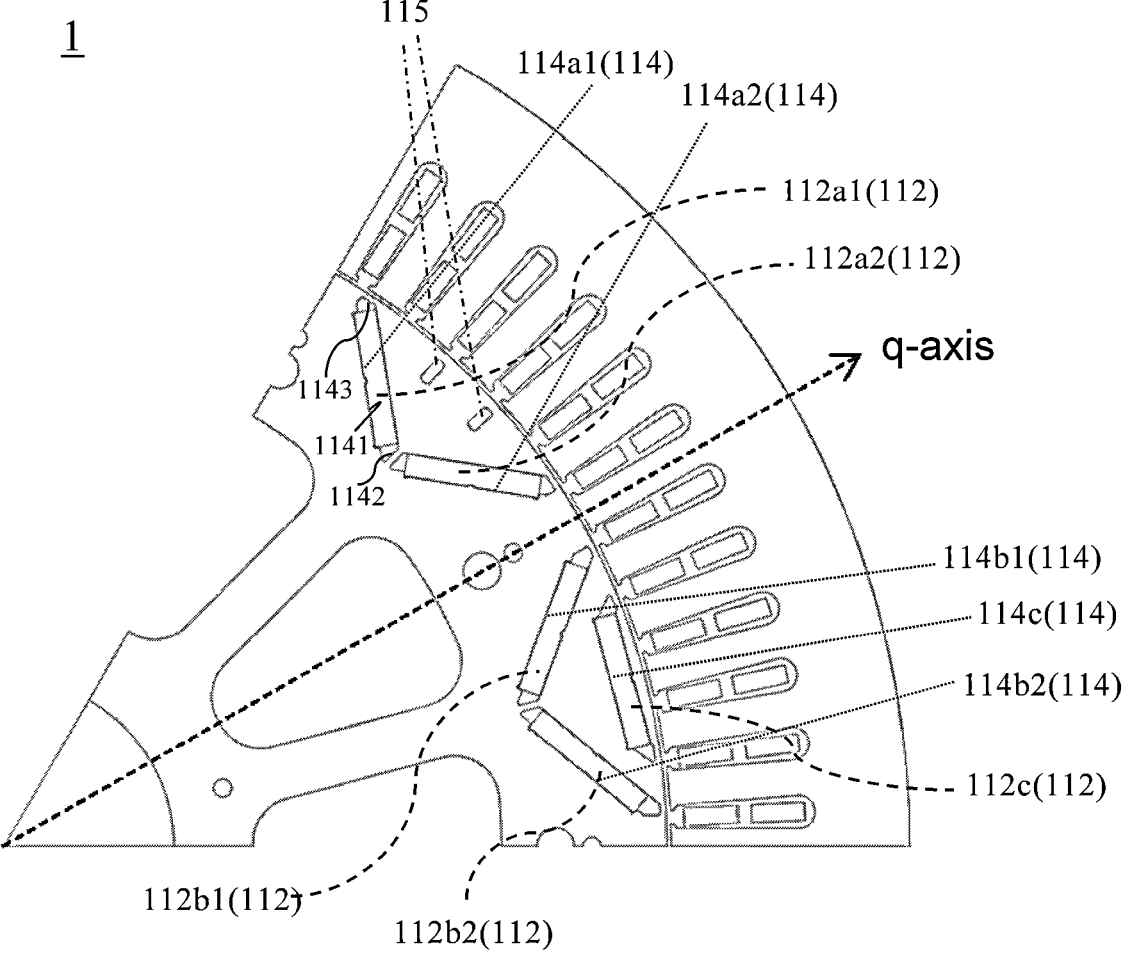
FIG. 4 is an enlarged cross-sectional view schematically illustrating a portion of the hybrid permanent magnet motor according to the first embodiment.

FIG. 3 schematically illustrates a hybrid permanent magnet motor 1 of the first embodiment when observed axially. Hybrid permanent magnet motor 1 (hereinafter referred to "motor 1") is an electric motor. FIG. 4 is an enlarged cross-sectional view schematically showing a portion of motor 1 when observed axially.

Hybrid permanent magnet motor 1 is an embedded type permanent magnet (IPM) motor. Motor 1 has: a rotor 11; and a stator 12. Rotor 11 rotates around the central axis. The rotor 11 and stator 12 are arranged radially opposite to each other through an air gap. In this embodiment, the motor 1 is of the inner rotor type, and the rotor 11 is arranged relative to the stator 12 through an air gap on the radial inner side. The rotor 11 rotates relative to the stator 12 with the central axis as the center. The rotor 11 includes a shaft (not shown) with a central axis, a rotor core 111, and a plurality of magnet parts 112. The rotor core 111 is a magnetic body. The rotor core 111 is composed of a plurality of electromagnetic steel plates stacked on each other in the axial direction, for example. The rotor core 111 is fixed to the outer surface of the shaft. The rotor core 111 has a shaft through hole 113. The shaft through hole 113 penetrates axially through the rotor core 111. As shown in FIG. 3, the shaft through hole 113 is a roughly circular shape centered on the central axis when observed axially. The shaft penetrates through the shaft through hole 113. The relative rotation of the shaft and rotor core 111 in the circumferential direction is suppressed. Motor 1 also has a housing (not shown) for storing rotor 11 and stator 12. The rotor 11 can be rotatably supported on the housing through bearings, and the stator 12 is fixed on the housing.

The rotor core 111 has a plurality of magnet installation slots 114. A plurality of magnet installation slots 114 are located radially on the outer side of the shaft through hole 113. A plurality of magnet installation slots 114, for example, penetrates axially through the rotor core 111. A plurality of magnet parts 112 are embedded inside a plurality of magnet installation slots 114 respectively. The fixing method of the magnet part 112 inside the magnet installation slot 114 is not particularly limited. For example, the magnet part 112 can be fixed inside the magnet installation slot 114 by filling the resin in the part of the magnet installation slot 114 other than the part where the magnet part 112 is located. In addition, any shape of through hole for reducing the weight of the rotor core can be set between the radial direction of the shaft through hole 113 and the magnet installation slot 114, or there can be no through hole for reducing the weight of the rotor core.

A plurality of magnet installation slots 114 include a pair of magnet installation slots 114a1, 114a2 (equivalent to the first magnet installation slot of the present invention); a pair of magnet installation slots 114b1, 114b2 (equivalent to the second magnet installation slot of the present invention); and a magnet installation slot 114c (equivalent to the third magnet installation slot of the present invention).

In this embodiment, a plurality of magnet parts 112 are manufactured from rare earth permanent magnet materials (such as neodymium iron boron). But it is not limited to this, the types of a plurality of magnet parts 112 are not particularly limited. A plurality of magnet parts 112 of rotor 11 are manufactured from the same type of permanent magnet material, for example. A plurality of magnet parts 112 include a pair of permanent magnets 112a1, 112a2 (equivalent to the first magnet part of the present invention); a pair of permanent magnets 112b1a 112b2 (equivalent to the second magnet part of the present invention); and permanent magnet 112c (equivalent to the third magnet part of the present invention).

The rotor 1 is provided with a plurality of first magnetic pole parts 20 and a plurality of second magnetic pole parts 30. The magnetic pole of the first magnetic pole part 20 (for example, the magnetic pole is N pole) is opposite to that of the second magnetic pole part 30 (for example, the magnetic pole is S pole). A plurality of first magnetic pole parts 20 and a plurality of second magnetic pole parts 30 are arranged in the circumferential direction. The first magnetic pole part 20 has at least one magnet installation slot 114 for placing magnets. The second magnetic pole part 30 has at least one magnet installation slot 114 for placing magnets. When observed axially, the first magnetic pole part 20 and the second magnetic pole part 30 are arranged alternately in the circumferential direction. The number of poles for motor 1 is not particularly limited. For example, the first magnetic pole part 20 and the second magnetic pole part 30 are respectively provided with six ones. In the following explanation, within each magnetic pole part, the side near the center line of the magnetic pole in the circumferential direction is referred to as the "circumferential inner side" based on a certain object.

The arrangement of the magnet in the first magnetic pole part 20 is different from that in the second magnetic pole part

30. As shown in FIGS. 3 and 4, in this embodiment, the first magnetic pole part 20 includes a pair of magnet installation slots 114*a*1, 114*a*2 and a pair of permanent magnets 112*a*1, 112*a*2. That is, a plurality of magnet installation slots 114 include a pair of magnet installation slots 114*a*1, 114*a*2 located at the first magnetic pole part 20. A pair of magnet installation slots 114*a*1, 114*a*2 are arranged apart from each other in the circumferential direction. The magnet installation slots 114*a*1, 114*a*2 extend roughly in a straight line along a tilted direction relative to the radial direction when observed axially. A pair of magnet installation slots 114*a*1, 114*a*2 exhibit a roughly V-shape when observed axially. A pair of magnet installation slots 114*a*1, 114*a*2 extend apart from each other in the circumferential direction as they moving towards the radial outer side. That is to say, the circumferential distance between a pair of magnet installation slots 114*a*1, 114*a*2 increases from the radial inner side to the radial outer side.

A pair of permanent magnets 112*a*1, 112*a*2 are respectively embedded inside a pair of magnet installation slots 114*a*1, 114*a*2. A permanent magnet 112*a*1 is embedded inside the magnet installation slot 114*a*1. A permanent magnet 112*a*2 is embedded inside the magnet installation slot 114*a*2. That is, a plurality of magnet parts 112 include a pair of permanent magnets 112*a*1, 112*a*2 embedded inside a pair of magnet installation slots 114*a*1, 114*a*2, respectively. Each permanent magnet 112*a*1, 112*a*2 exhibits a roughly rectangular shape when observed axially. Each permanent magnet 112*a*1, 112*a*2 is separately arranged within the entire axial range of the magnet installation slots 114*a*1, 114*a*2, for example. Paired permanent magnets 112*a*1, 112*a*2 are arranged apart from each other in the circumferential direction.

The second magnetic pole part 30 includes a pair of magnet installation slots 114*b*1, 114*b*2, a pair of permanent magnets 112*b*1, 112*b*2, a magnet installation slot 114*c*, and a permanent magnet 112*c*. That is, a plurality of magnet installation slots 114 include: a pair of magnet installation slots 114*b*1, 114*b*2 located at the second magnetic pole part 30; and a magnet installation slot 114*c* located at the second magnetic pole part 30. A pair of magnet installation slots 114*b*1, 114*b*2 are arranged apart from each other in the circumferential direction. The magnet installation slots 114*b*1, 114*b*2 extend roughly in a straight line along a tilted direction relative to the radial direction when observed axially. A pair of magnet installation slots 114*b*1, 114*b*2 exhibit a roughly V-shape when observed axially. A pair of magnet installation slots 114*b*1, 114*b*2 extend apart from each other in the circumferential direction as they moving towards the radial outer side. That is to say, the circumferential distance between a pair of magnet installation slots 114*b*1, 114*b*2 increases from the radial inner side to the radial outer side. The magnet installation slot 114*c* is located on the air gap side of a pair of magnet installation slots 114*b*1, 114*b*2 when observed axially (in this example, radial outer side). Moreover, when observed axially, the magnet installation slot 112*c* is located on the circumferential inner side of a pair of magnet installation slots 114*b*1, 114*b*2. In addition, the magnet installation slots 114*c* are arranged closer to the air gap than the magnet installation slots 114*a*1, 114*a*2 of the first magnetic pole part 20 in the radial direction. In this embodiment, the magnet installation slot 112*c* is located closer to the outer side than a pair of magnet installation slots 114*a*1, 114*a*2 in the radial direction. The magnet installation slot 114*c* extends in a straight line shape when observed axially. The magnet installation slot 114*c* extends roughly in a straight line shape along the tangential direction when observed axially, for example.

A pair of permanent magnets 112*b*1, 112*b*2 are respectively embedded inside a pair of magnet installation slots 114*b*1, 114*b*2. A permanent magnet 112*b*1 is embedded inside the magnet installation slot 114*b*1. A permanent magnet 112*b*2 is embedded inside the magnet installation slot 114*b*2. A permanent magnet 112*c* is embedded inside the magnet installation slot 114*c*. A permanent magnet 112*c* is embedded inside the magnet installation slot 114*c*. That is, a plurality of magnet parts 112 include: a pair of permanent magnets 112*b*1, 112*b*2 embedded inside a pair of magnet installation slots 114*b*1, 114*b*2 respectively; and a permanent magnet 112*c* embedded inside the magnet installation slot 114*c*. Each permanent magnet 112*b*1, 112*b*2 exhibits a roughly rectangular shape when observed axially. The permanent magnets 112*b*1, 112*b*2 are separately arranged within the entire axial range of the magnet installation slots 114*b*1, 114*b*2. Paired permanent magnets 112*b*1, 112*b*2 are arranged apart from each other in the circumferential direction. The permanent magnet 112*c* exhibits a roughly rectangular shape when observed axially. The permanent magnet 112*c* is arranged within the entire axial range of the magnet installation slot 114*c*, for example.

The amount of magnets used in the second magnetic pole part 30 is greater than that used in the first magnetic pole part 20. In other words, the amount of magnets used in the first magnetic pole part 20 is reduced compared to the amount of magnets used in the second magnetic pole part 30, and correspondingly, the magnet installation slot is reduced. The size of the magnet installation slot varies between adjacent magnetic poles. In this embodiment, the amount of magnets used for the magnet part of the first magnetic pole part 20 embedded inside a pair of magnet installation slots 114*a*1, 114*a*2, which is the pair of permanent magnets 112*a*1, 112*a*2 is less than the amount of magnets used for the magnet part of the second magnetic pole part 30 embedded inside a pair of magnet installation slots 114*b*1, 114*b*2, which is the permanent magnet 112*c*.

As shown in FIG. 4, when observed axially, a plurality of magnet parts 112 are formed asymmetrically relative to the q-axis (center line between poles). A plurality of magnet installation slots 114 are formed asymmetrically relative to the q-axis. In addition, when observed axially, a plurality of the magnet parts 112 of motor 1 are formed asymmetrically relative to the d-axis (magnetic pole centerline) (FIG. 3). A plurality of magnet installation slots 114 are formed asymmetrically relative to the d-axis. In one example, the combination of a plurality of sets of magnet parts 112 and the magnet installation slots 114 embedded with the magnet part 112 is symmetrical relative to the d-axis.

Generally speaking, the design of an asymmetric d-axis will result in different torque outputs of the motor during forward and reverse rotation. In this embodiment, a plurality of magnet parts 112 (magnet installation slots 114) are formed to be symmetrically relative to the d-axis, which can suppress the situation that the motor has different torque outputs during forward and reverse rotation.

In addition, the rotor core 111 is provided with at least one magnetic resistance groove 115 on the radial outer side of the magnet installation slots 114*a*1, 114*a*2. The magnetic resistance groove 115 penetrates axially through the rotor core 111. The magnetic resistance groove 115 is located, for example, on the circumferential inner side of the V shape of a pair of magnet installation slots 114*a*1, 114*a*2. In this embodiment, two magnetic resistance grooves 115 are provided on the radial outer side of the V shape of magnetic installation slots 114a1, 114a2, but it is not limited to this. For example, when the radial outer space of the V shape of the magnet installation slots 114a1, 114a2 is larger, more magnetic resistance grooves can be arranged. That is to say, the rotor core 111 is provided with at least one magnetic resistance groove 115 axially penetrating on the side of the magnetic pole part with less magnetic usage closer to the air gap than the magnetic installation slot 114. In addition, the design of magnetic resistance grooves is not necessary, and if it can satisfy the application requirements, magnetic resistance grooves can also be eliminated.

Variant 1 of First Embodiment

Figure 5:
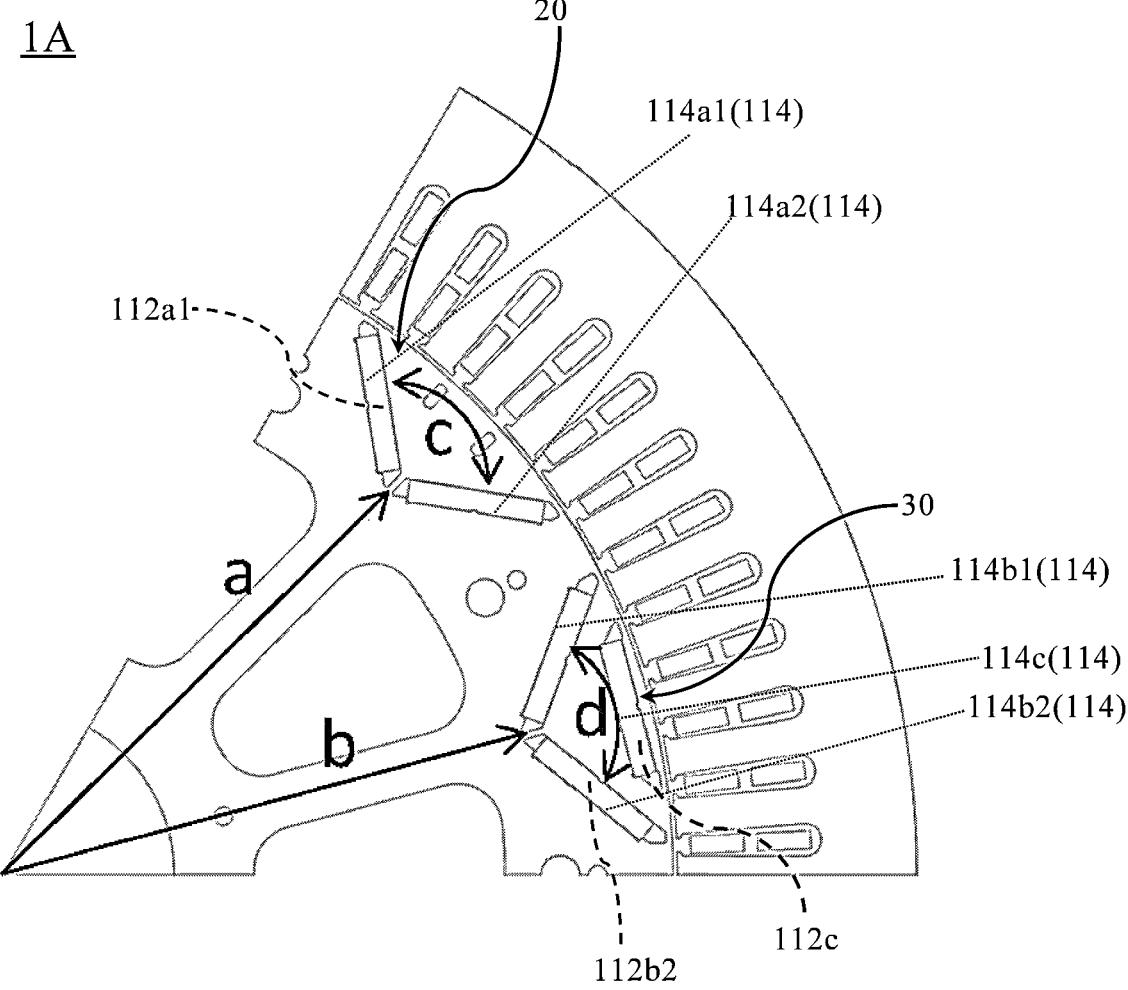
FIG. 5 is a partial cross-sectional view schematically showing the motor in variant 1.

FIG. 5 is a partial cross-sectional view showing the motor 1A of variant 1. In FIG. 5, the same symbols are added to the elements that are the same as the constituent elements of the first embodiment, and the explanations are omitted.

In this variant, when the distance between the circumferential center of a pair of magnet installation slots 114a1, 114a2 of the first magnetic pole part 20 and the central axis is set to a when observed axially and the distance between the circumferential center of a pair of magnet installation slots 114b1, 114b2 of the second magnetic pole part 30 and the central axis is set to b when observed axially, a and b can be the same or different. When observed axially, the circumferential centers of the pair of magnet installation slots 114a1, 114a2 that extend apart from each other in the circumferential direction as they moving towards the radial outer side are located at the circumferential center of the radial inner end of the pair of magnet installation slots 114a1, 114a2. When observed axially, the circumferential centers of the pair of magnet installation slots 114b1, 114b2 that extend apart from each other in the circumferential direction as they moving towards the radial outer side are located at the circumferential center of the radial inner end of the pair of magnet installation slots 114b1, 114b2. In a preferred solution, a>b. In addition, when the included angle between the pair of magnet installation slots 114a1, 114a2 when observed axially is set to c and the included angle between the pair of magnet installation slots 114b1, 114b2 when observed axially is set to d, a and b can be the same or different. In a preferred solution, d>c. In a further preferred solution, a>b and d>c.

Variant 2 of First Embodiment

Figure 6:
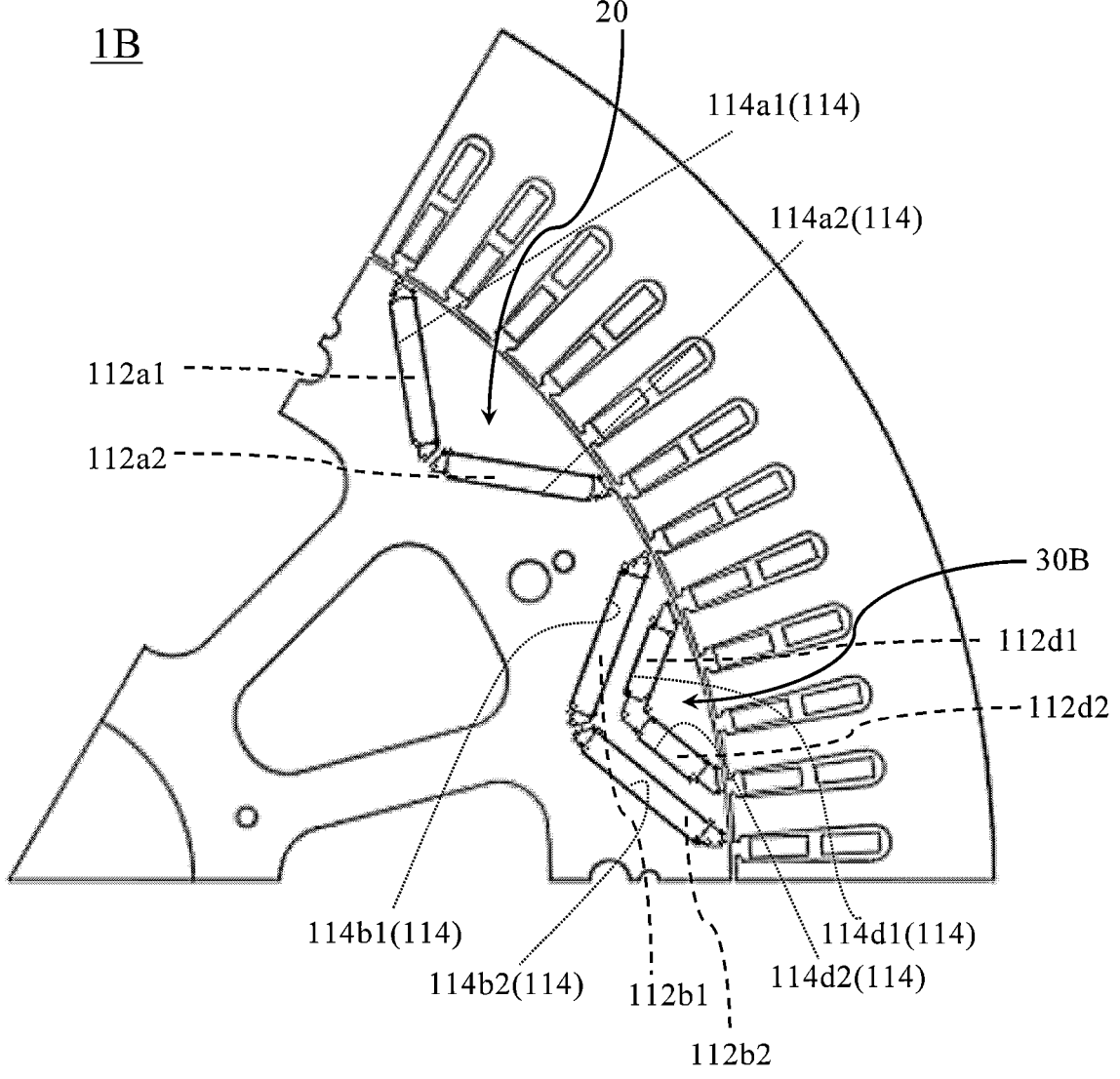
FIG. 6 is a partial cross-sectional view schematically showing the motor in variant 2.

FIG. 6 is a partial cross-sectional view showing the motor 1B of variant 1. The basic structure of this variant case 2 is the same as the first embodiment, with the main difference being the placement of the magnet of the second magnetic pole part 30B. Below, the main differences from the first embodiment will be described, with the same symbols marked on the constituent elements that are the same as the first embodiment mentioned above and repeated explanations omitted.

A plurality of magnet installation slots 114 include a pair of magnet installation slots 114a1, 114a2 (equivalent to the first magnet installation slot of the present invention); a pair of magnet installation slots 114b1, 114b2 (equivalent to the second magnet installation slot of the present invention); and magnet installation slots 114d1, 114d2 (equivalent to the third magnet installation slot of the present invention).

A plurality of magnet parts 112 include a pair of permanent magnets 112a1, 112a2 (equivalent to the first magnet part of the present invention); a pair of permanent magnets 112b1 112b2 (equivalent to the second magnet part of the present invention); and a pair of permanent magnets 112d1, 112d2 (equivalent to the third magnet part of the present invention).

The rotor 1B is provided with a plurality of first magnetic pole parts 20 and a plurality of second magnetic pole parts 30B. The magnetic pole of the first magnetic pole part 20 (for example, the magnetic pole is N pole) is opposite to that of the second magnetic pole part 30 (for example, the magnetic pole is S pole). A plurality of first magnetic pole parts 20 and a plurality of second magnetic pole parts 30B are arranged in the circumferential direction. When observed axially, the first magnetic pole part 20 and the second magnetic pole part 30B are arranged alternately in a circumferential direction. For example, the first magnetic pole part 20 and the second magnetic pole part 30B are respectively provided with six ones.

The arrangement of the magnet in the first magnetic pole part 20 is different from that in the second magnetic pole part 30B. As shown in FIG. 6, in this variant, the first magnetic pole part 20 includes a pair of magnet installation slots 114a1, 114a2, and a pair of permanent magnets 112a1, 112a2, as in the first embodiment.

The second magnetic pole part 30B includes a pair of magnet installation slots 114b1, 114b2, a pair of permanent magnets 112b1, 112b2, a pair of magnet installation slots 114d1, 114d2, and a pair of permanent magnets 112d1, 112d2. That is, a plurality of magnet installation slots 114 include: a pair of magnet installation slots 114b1, 114b2 located at the second magnetic pole part 30B; and a pair of magnet installation slots 114d1, 114d2 located at the second magnetic pole part 30B. A pair of magnet installation slots 114b1, 114b2 are arranged apart from each other in the circumferential direction. The magnet installation slots 114b1, 114b2 extend roughly in a straight line along a tilted direction relative to the radial direction when observed axially. A pair of magnet installation slots 114b1, 114b2 exhibit a roughly V-shape when observed axially. A pair of magnet installation slots 114b1, 114b2 extend apart from each other in the circumferential direction as they moving towards the radial outer side. That is to say, the circumferential distance between a pair of magnet installation slots 114b1, 114b2 increases from the radial inner side to the radial outer side. A pair of magnet installation slots 114d1, 114d2 are located on the air gap side of the pair of magnet installation slots 114b1, 114b2 when observed axially (in this example, radial outer side). Moreover, when observed axially, a pair of magnet installation slots 114d1, 114d2 are located on the circumferential inner side of a pair of magnet installation slots 114b1, 114b2. In addition, the magnet installation slots 114d1, 114d2 are arranged closer to the air gap than the magnet installation slots 114a1, 114a2 of the first magnetic pole part 20 in the radial direction. In this variant, when observed axially, the circumferential inner ends of a pair of magnet installation slots 114d1, 114d2 are connected to each other. A pair of magnet installation slots 114d1, 114d2 extend roughly in a straight line along a tilted direction relative to the radial direction when observed axially. A pair of magnet installation slots 114d1, 114d2 exhibit a roughly V-shape when observed axially. A pair of magnet installation slots 114d1, 114d2 extend apart from each other in the circumferential direction as they moving towards the radial outer side. In the second magnetic pole part 30B, when observed axially, the magnet installation slots 114d1, 114d2 extend parallel to the magnet installation slots 114b1, 114b2, respectively.

A pair of permanent magnets 112b1, 112b2 are respectively embedded inside a pair of magnet installation slots

114*b*1, 114*b*2. A permanent magnet 112*b*1 is embedded inside the magnet installation slot 114*b*1. A permanent magnet 112*b*2 is embedded inside the magnet installation slot 114*b*2. A pair of permanent magnets 112*d*1, 112*d*2 are embedded inside a pair of magnet installation slots 114*d*1, 114*d*2. A permanent magnet 112*d*1 is embedded inside the magnet installation slot 114*d*1. A permanent magnet 112*d*2 is embedded inside the magnet installation slot 114*d*2. That is, a plurality of magnet parts 112 include: a pair of permanent magnets 112*b*1, 112*b*2 embedded inside a pair of magnet installation slots 114*b*1, 114*b*2 respectively; and a pair of permanent magnets 112*d*1, 112*d*2 embedded inside a pair of magnet installation slots 114*d*1, 114*d*2. The permanent magnets 112*b*1, 112*b*2 exhibit a roughly rectangular shape when observed axially. The permanent magnets 112*b*1, 112*b*2 are arranged within the entire axial range of the magnet installation slots 114*b*1, 114*b*2, for example. Paired permanent magnets 112*b*1, 112*b*2 are arranged apart from each other in the circumferential direction. The permanent magnets 112*d*1, 112*d*2 exhibit a roughly rectangular shape when observed axially. The permanent magnets 112*d*1, 112*d*2 are arranged within the entire axial range of the magnet installation slots 114*d*1, 114*d*2, for example. Paired permanent magnets 112*d*1, 112*d*2 are arranged apart from each other in the circumferential direction. A pair of magnet installation slots 114*b*1, 114*b*2 and a pair of magnet installation slots 114*d*1, 114*d*2 are arranged in the radial direction According to the present embodiment and the structure of the variant, the rotor of the hybrid permanent magnet motor of this disclosure has a different magnet arrangement in the first magnetic pole part 20 from that in the second magnetic pole parts 30, 30B, and the amount of magnets used in the second magnetic pole parts 30, 30B is more than that in the first magnetic pole part 20, thus, for example, compared to the case of a general permanent magnet motor, the amount of permanent magnet material used can be reduced, and an appropriate reluctance torque can be achieved, realizing proper torque and restraining the increase of open circuit counter-electromotive force. By adjusting the magnetic circuit design, this disclosure is able to maintain the same level of electromagnetic and reluctance torque with less magnetic usage. Next, provide an example for further explanation.

For example, provide an example of using a hybrid permanent magnet motor of variant 2.

Figure 7A:
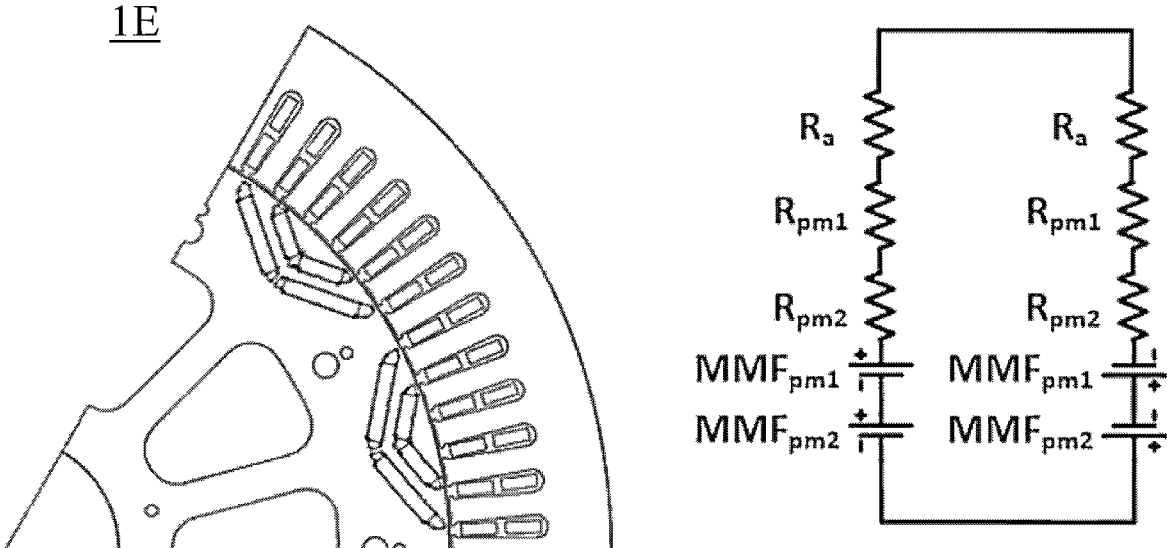
FIG. 7a is a partial schematic diagram showing an example of the current general permanent magnet motor and its corresponding magnetic circuit.
Figure 7B:
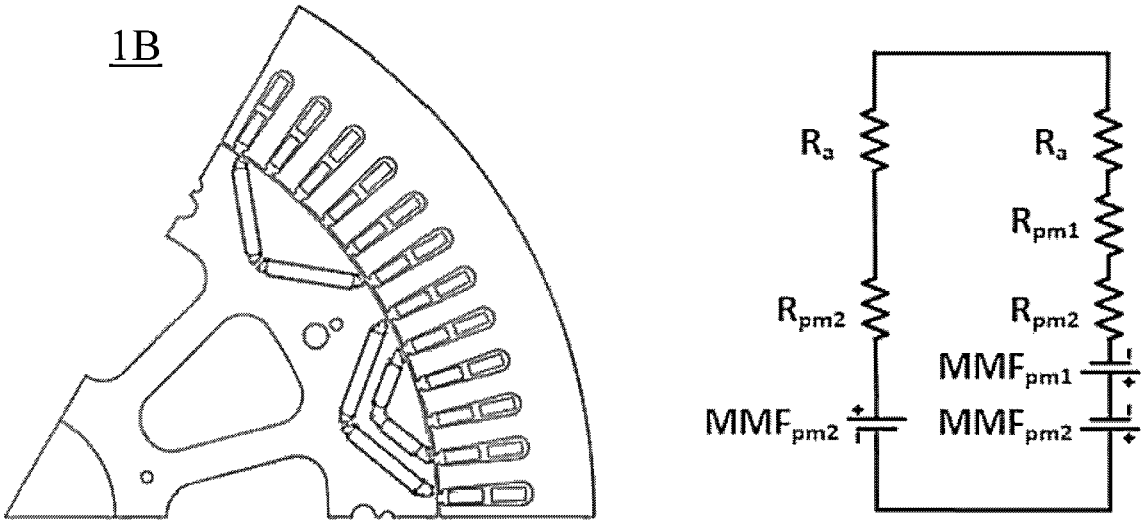
FIG. 7b is a partial schematic diagram showing an example of the motor in variant 2 and its corresponding magnetic circuit.
Figure 8A:
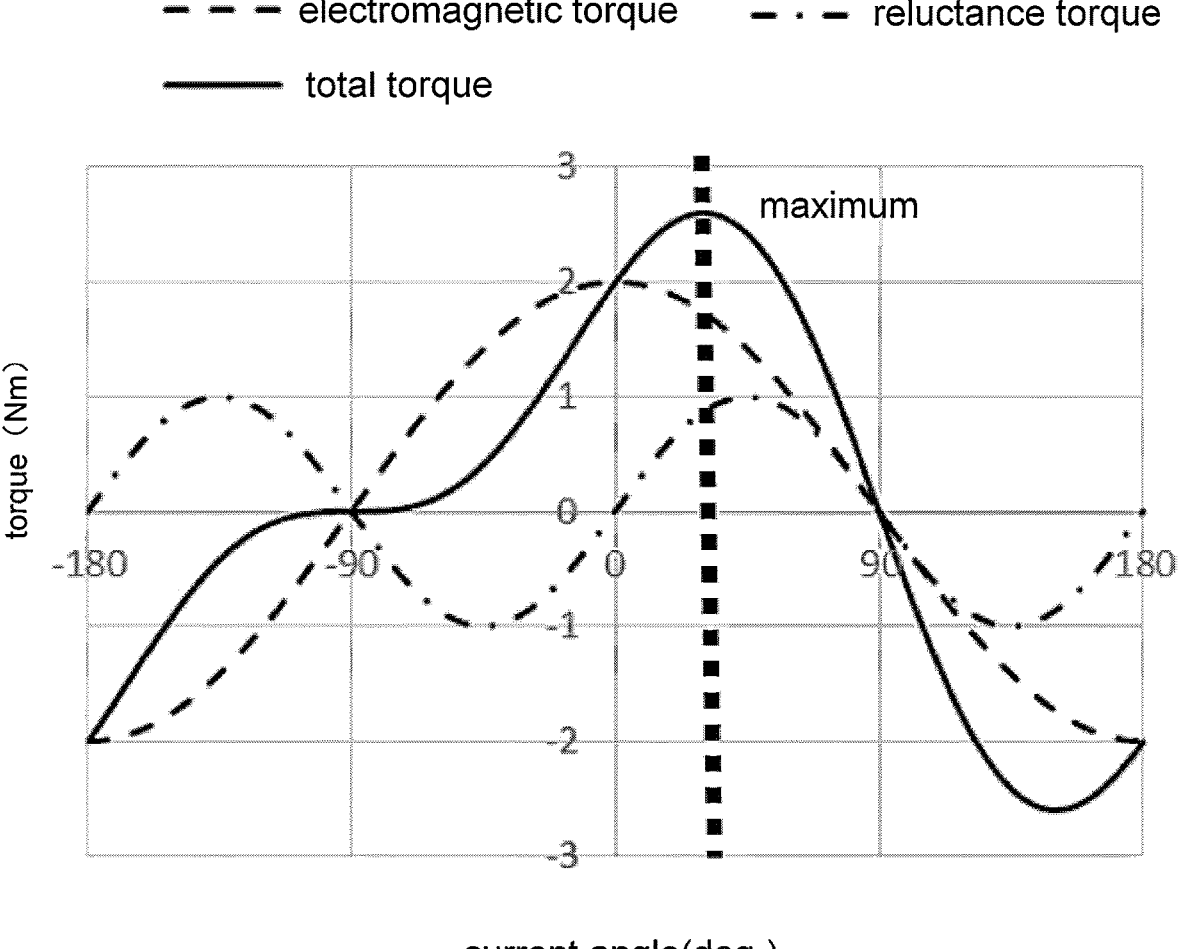
Figure 8B:
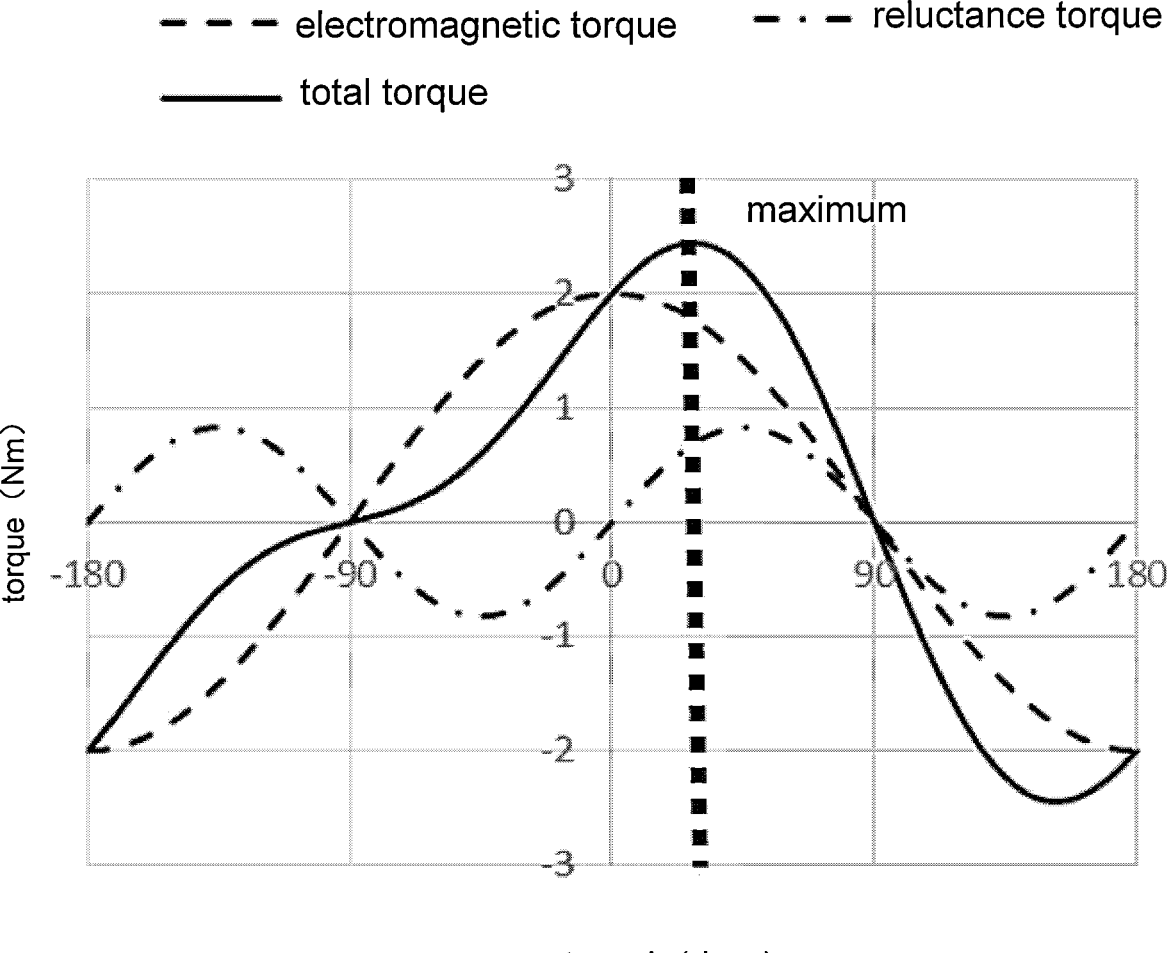
FIG. 8b shows the torque curve corresponding to the example in FIG. 7b.

FIG. 7*a* is a partial schematic diagram and its corresponding magnetic circuit of the existing permanent magnet motor 1E. There are a plurality of magnetic pole parts on the rotor of the permanent magnet motor 1E in the circumferential direction, each of which includes a double V-shaped magnet installation slot and a double V-shaped magnet. FIG. 8*a* shows the torque curve corresponding to the example in FIG. 7*a*. FIG. 7*b* is a partial schematic diagram and its corresponding magnetic circuit of an example of hybrid permanent magnet motor 1B of variant 2. The magnet arrangement of the first magnetic pole is different from that of the second magnetic pole, and the amount of magnets used in the second magnetic pole is more than that used in the first magnetic pole, which is different from that of permanent magnet motor 1E. FIG. 8*b* shows the torque curve corresponding to the example in FIG. 7*b*.

(1) As shown in the magnetic circuit on the right side of FIG. 7*a*, the magnetic flux $\Phi_{pm}$ of permanent magnet motor 1E is:

magnetic flux of permanent magnet motor $(\Phi_{pm}) =$ $$\frac{2(MMF_{pm1} + MMF_{pm2})}{2(R_a + R_{pm1} + R_{pm2})} = \frac{MMF_{pm1} + MMF_{pm2}}{R_a + R_{pm1} + R_{pm2}}$$

(In the formula, $MMF_{pm1}$: first layer magnetomotive force; $MMF_{pm2}$: second layer magnetomotive force; $R_a$: air gap magnetoresistance; $R_{pm1}$: first layer magnetoresistance; $R_{pm2}$: second layer magnetoresistance).

Assuming an air gap of 0.9 mm and a magnet thickness of 5 mm (when observed axially), then $R_a$:$R_{pm1}$:$R_{pm2}$=1: 5.55:5.55. Assuming that the length of the first layer magnet is 26 mm (when observed axially) and the length of the second layer magnet is 15 mm, then $MMF_{pm1}$:$MMF_{pm2}$=1: 1.73. The magnetic flux is:

$$\text{magnetic flux} = \frac{2.73 \times MMF_{pm1}}{12.1 \times R_a} = \frac{0.23 \times MMF_{pm1}}{R_a}$$

(2) As shown in the magnetic circuit on the right side of FIG. 7*b*, the magnetic flux $\Phi_{hb}$ of hybrid permanent magnet motor 1B is:

magnetic flux of hybrid permanent magnet motor $(\Phi_{hb}) = \frac{MMF_{pm1} + 2MMF_{pm2}}{2R_a + R_{pm1} + 2R_{pm2}}$ (In the formula, $MMF_{pm1}$: first layer magnetomotive force; $MMF_{pm2}$: second layer magnetomotive force; $R_a$: air gap magnetoresistance; $R_{pm1}$: first layer magnetoresistance; $R_{pm2}$: second layer magnetoresistance).

Assuming an air gap of 0.9 mm and a magnet thickness of 5 mm (when observed axially), then $R_a$:$R_{pm1}$:$R_{pm2}$=1: 5.55:5.55. Assuming that the length of the first layer magnet is 26 mm (when observed axially) and the length of the second layer magnet is 15 mm, then $MMF_{pm1}$:$MMF_{pm2}$=1: 1.73.
The magnetic flux is:

$$\text{magnetic flux} = \frac{4.46 \times MMF_{pm1}}{18.65 \times R_a} = \frac{0.24 \times MMF_{pm1}}{R_a}$$

In this way, in the case of hybrid permanent magnet motor 1B, it can provide a magnetic flux similar to that of a general permanent magnet motor through 82% magnet usage.

The torque composition of permanent magnet motor 1E and hybrid permanent magnet motor 1B is further compared.

(3) In the case of permanent magnet motor 1E, the torque equation is:

$$T_t = \frac{3P}{2}\left((\lambda_{pm}I\cos(\theta)) + \left((L_d - L_q)I^2\sin(2\theta)\right)\right)$$

(In the formula, $T_t$: total torque; P: motor pole pairs; $\lambda_{pm}$: flux chain; I: current; $\theta$: current angle; $L_d$=d-axis inductance; $L_q$=q-axis inductance).

Assuming the electromagnetic torque with a reluctance torque of 2:1, as shown in FIG. 8*a*, a maximum total torque of 2.6, an electromagnetic torque of 1.73 (67%), and a reluctance torque of 0.87 (33%).

(4) In the case of hybrid permanent magnet motor 1B, the torque equation is:

$$T_t = \frac{3P}{2}\left((\lambda_{pm}I\cos(\theta)) + (0.82(L_d - L_q)I^2\sin(2\theta))\right)$$

Due to the increase in the area of the magnet installation slot to 82% of the permanent magnet motor 1E, the reluctance torque component also becomes 82% of the permanent magnet motor 1E. As shown in FIG. 8*b*, the maximum total torque is 2.45, the electromagnetic torque is 1.77 (72%), and the reluctance torque is 0.68 (28%).

In the hybrid permanent magnet motor 1B, only an additional 6% of the magnet usage is required to output the same torque as a general permanent magnet motor (from 2.45 to 2.60). And at this time, the permanent magnet usage is approximately 87% of that of a general permanent magnet motor. And the magnetic flux only increased by 6% (the magnet usage is from 82% to 87%), and the reverse electromotive potential energy of the open circuit remained at the same level as that of permanent magnet motor 1E.

In addition, the hybrid permanent magnet motor in this disclosure is preferably provided with at least one magnetic resistance groove 115 axially penetrating on the side of the magnetic pole part with less magnetic usage closer to the air gap than the magnetic installation slot 115. Therefore, it can play a role in suppressing torque pulsation. In particular, In the case of a hybrid permanent magnet motor that the first magnetic pole part 20 has first magnet installation slots arranged in V shape, and the second magnetic pole part 30 has second and third magnet installation slots arranged in A shape (Delta type), for example, compared to the case that the first magnetic pole part 20 has first magnet installation slots arranged in V shape and the second magnetic pole part 30B has second and third magnet installation slots arranged in double V-shape, torque pulsation can be further suppressed.

when the distance between the circumferential center of a pair of magnet installation slots 114*a*1, 114*a*2 of the first magnetic pole part 20 and the central axis is set to a when observed axially and the distance between the circumferential center of a pair of magnet installation slots 114*b*1, 114*b*2 of the second magnetic pole part 30 and the central axis is set to b when observed axially, a>b is preferred.

When the included angle between a pair of magnet installation slots 114*a*1, 114*a*2 when observed axially is set to c, and the included angle between a pair of magnet installation slots 114*b*1, 114*b*2 when observed axially is set to d, from the perspective of better torque performance, d>c is preferred, a>b and d>c is further preferred.

Other Variants

In addition, the above first embodiment shows that the first magnetic pole part 20 has first magnet installation slots arranged in V shape, and the second magnetic pole part 30 has second and third magnet installation slots arranged in Δ shape (Delta type), the above variant 2 shows that the first magnetic pole part 20 has first magnet installation slots arranged in a V shape, and the second magnetic pole part 30B has second and third magnet installation slots arranged in double V shape, but the present invention is not limited to this. It can also be that the first magnetic pole part has a first magnet installation slot that continuously extends in the circumferential direction when observed axially, the first magnet installation slot, for example, exhibit an arc shape with the middle part bent towards the opposite side of the air gap, and is embedded with an arc-shaped magnet part inside. It can also be that the second magnetic pole part has a second magnet installation slot that continuously extends in the circumferential direction when observed axially, the second magnet installation slot, for example, exhibit an arc shape with the middle part bent towards the opposite side of the air gap, and is embedded with an arc-shaped magnet part inside. It can also be that the second magnetic pole part also has a third magnet installation slot that continuously extends in the circumferential direction when observed axially, the third magnet installation slot is located on the air gap side of the second magnet installation slot and is located circumferentially inward, for example, exhibit an arc shape with the middle part bent towards the opposite side of the air gap, and is embedded with an arc-shaped magnet part inside.

In addition, for example, a magnetic flux blocking part can be appropriately installed in the magnet installation slot. In one example, the magnet installation slot 114*a*1 has a main body 1141, an inner end portion 1142, and an outer end portion 1143 (FIG. 4). Moreover, the magnet installation slot 114*a*2 also has a main body, an inner end portion, and an outer end portion. Taking the magnet installation slot 114*a*1 as an example for explanation. When observed axially, the main body extends in a straight line shape in the direction along which the magnet installation slot 114 extends. For example, the main body 1141 is exhibits a rectangular shape when observed axially. The magnet part 112 is embedded into the main body 1141. The inner end portion 1142 is connected to the radial inner end portion of the main body 1141. The inner end portion 1142 is the radial inner end portion of the magnet installation slot 114*a*1. The outer end portion 1143 is connected to the radial outer end portion of the main body 1141. The outer end 1143 is the radial outer end portion of the magnet installation slot 114*a*1. The inner end portion 1142 and the outer end portion 1143 are respectively filled with resin to form a magnetic flux blocking part. Here, the "magnetic flux blocking part" represents the part that can suppress the flow of magnetic flux. That is to say, it is difficult for magnetic flux to pass through various magnetic flux blocking parts. As long as each magnetic flux blocking part can suppress the flow of magnetic flux, there is no special limit, and it can include gap parts or non magnetic parts other than resin. It can also be that the magnet installation slots 114*b*1, 114*b*2 have a main body, an inner end portion, and an outer end portion, respectively. It can also be that the magnet installation slot 114*c* has a main body, a circumferential end portion, and a circumferential other end portion.

In addition, the above first embodiment and variants 1, 2 illustrate the case that a plurality of magnet parts 112 are manufactured from the same type of permanent magnet material, but the present invention is not limited to this. A plurality of the magnet parts 112 of the hybrid permanent magnet motor rotor in this disclosure can be manufactured from the same type of permanent magnet material, or different types of permanent magnet materials can be mixed and used. In one example, a plurality of magnet parts 112 are all neodymium iron boron permanent magnets. From the perspective of motor performance, under the same motor volume, all permanent magnet installation slots are provided with neodymium iron boron permanent magnets with high coercivity, and the performance will be better than that of the motor mixed with other low coercivity permanent magnet materials or using low coercivity permanent magnet materials. In another example, the first magnetic pole part 20 has first magnet installation slots arranged in V shape, the second and third magnet installation slots arranged in V shape of the second magnetic pole part 30B are arranged in the radial direction (FIG. 6), a pair of permanent magnets 112a1, 112a2 in large V shape of the first magnetic pole part 20 are neodymium iron boron permanent magnets, and in the second magnetic pole part 30B, the permanent magnets 112d1, 112d2 in small V shape as the outer layer are aluminum nickel cobalt permanent magnets, a pair of permanent magnets 112b1, 112b2 in large V shape as the inner side are neodymium iron boron permanent magnets. When different types of permanent magnet materials are mixed and used, the effect of reducing the amount of permanent magnets while maintaining output torque can also be achieved.

In addition, in the first embodiment and various variants mentioned above, an example of a hybrid permanent magnet motor being an internal rotor type motor is shown, but the present invention is not limited to this. It can also be an external rotor type motor.

In addition, in the first embodiment and various variations mentioned above, an example of hybrid permanent magnet motor used for electric motor is shown, but the present invention is not limited to this. It can also be a generator. The use of hybrid permanent magnet motor is not particularly limited. For example, it can be installed on vehicles or on equipment other than the vehicle.

The preferred embodiments of the present invention have been explained above with reference to the accompanying drawings, but the present invention is not limited to the above examples. The various shapes, combinations, etc. of each structural component shown in the above example are only one example, and various changes can be made according to design requirements, etc., without departing from the main purpose of the present invention. The constituent elements recorded as the above embodiments and its variations can be appropriately combined within the scope of the main idea of the present invention, and some of the combined constituent elements can also be appropriately not used.

What is claimed is:

1. A hybrid permanent magnet motor (1), comprising:
a hybrid permanent magnet motor rotor (11), rotating around a central axis, and comprising:
a rotor core (111) provided with a plurality of magnet installation slots (114); and a plurality of magnet parts (112) embedded inside a plurality of magnet installation slots respectively, wherein
the rotor is provided with a plurality of first magnetic pole parts (20) and a plurality of second magnetic pole parts (30), the magnetic poles of the first magnetic pole part and the second magnetic pole part are arranged in opposite and alternately in the circumferential direction,
the magnetic placement of the first magnetic pole part is different from that of the second magnetic pole part, the amount of magnets used in the second magnetic pole part is greater than that used in the first magnetic pole part; and
a stator, which is arranged via an air gap relative to the hybrid permanent magnet motor rotor in the radial direction, wherein:
a plurality of the magnet installation slots includes:
a first magnet installation slot (114a1, 114a2) located at the first magnetic pole part;
a second magnet installation slot (114b1, 114b2) located at the second magnetic pole part; and
a third magnet installation slot (114c, 114d1, 114d2) located at the second magnetic pole part, the third magnet installation slot is located on the air gap side of the second magnet installation slot when observed axially, and is arranged closer to the air gap than the first magnet installation slot in the radial direction,
a plurality of the magnet parts include:
a first magnet part (112a1, 112a2) embedded inside the first magnet installation slot;
a second magnet part (112b1, 112b2) embedded inside the second magnet installation slot; and
a third magnet part (112c, 112d1, 112d2) embedded inside the third magnet installation slot, wherein:
the first magnetic pole part includes a pair of the first magnet installation slots (114a1, 114a2) extending separately from each other in the circumferential direction as they moving towards the air gap side when observed axially; a pair of second magnet installation slots (114b1, 114b2) extending separately from each other in the circumferential direction as they moving towards the air gap side when observed axially; and the third magnet installation slots (114c) with a straight line shape extending in a tangential direction when observed axially, wherein:
the hybrid permanent magnet motor rotor is located radially inside of the stator,
when the distance between the circumferential center of a pair of the first magnet installation slots and the central axis is set to a when observed axially, and the distance between the circumferential center of a pair of the second magnet installation slots and the central axis is set to b when observed axially, a>b is satisfied, and
when the included angle between a pair of the first magnet installation slots when observed axially is set to be c, and the included angle between a pair of the second magnet installation slots when observed axially is set to be d, d>c is satisfied.

* * * * *